(12) United States Patent
Poorman et al.

(10) Patent No.: US 8,264,795 B2
(45) Date of Patent: Sep. 11, 2012

(54) FLEXIBLE CIRCUIT FOR USE WITH A MAGNETIC HEAD

(75) Inventors: Paul W. Poorman, Meridian, ID (US); Lawrence A. Hansen, Meridian, ID (US); Marc R. Humann, Breitenbrunn (AT)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/183,440

(22) Filed: Jul. 15, 2011

(65) Prior Publication Data

US 2011/0271729 A1  Nov. 10, 2011

Related U.S. Application Data

(62) Division of application No. 11/796,673, filed on Apr. 27, 2007, now Pat. No. 8,004,797.

(51) Int. Cl.
*G11B 5/48* (2006.01)
(52) U.S. Cl. ...................... 360/241; 360/261.1
(58) Field of Classification Search .................. 360/241, 360/241.1, 251.1, 260, 261.1, 245.9, 290, 360/261.2, 261.3, 291; 174/250, 254; 439/67, 439/77, 493; 361/749; 720/652, 653
See application file for complete search history.

(56) References Cited

U.S. PATENT DOCUMENTS

| | | | | |
|---|---|---|---|---|
| 5,446,240 A * | 8/1995 | Hayakawa et al. | ............. | 174/69 |
| 5,446,609 A * | 8/1995 | Thanos et al. | ............. | 360/97.02 |
| 5,499,161 A * | 3/1996 | Hosseinzadeh et al. | ...... | 361/749 |
| 5,537,270 A * | 7/1996 | Morehouse et al. | ........ | 360/97.02 |
| 5,539,595 A * | 7/1996 | Beck et al. | ................. | 360/97.01 |
| 5,852,530 A * | 12/1998 | Kotaki et al. | .................... | 360/95 |
| 5,963,399 A * | 10/1999 | Briggs et al. | ............... | 360/266.3 |
| 6,078,483 A * | 6/2000 | Anderson | .................. | 360/261.1 |
| 6,273,748 B1 * | 8/2001 | Komatsu et al. | .............. | 439/496 |
| 6,341,115 B1 * | 1/2002 | Otani et al. | .................... | 720/653 |
| 6,388,980 B2 * | 5/2002 | Otani et al. | .................... | 720/603 |
| 6,404,598 B1 * | 6/2002 | Nayak et al. | .................. | 360/291 |
| 6,769,920 B1 * | 8/2004 | Mease et al. | ..................... | 439/67 |
| 6,856,490 B2 * | 2/2005 | Rosner et al. | ............... | 360/264.2 |
| 7,054,147 B2 * | 5/2006 | Maatta et al. | ............ | 361/679.27 |
| 7,116,522 B2 * | 10/2006 | Poorman | ....................... | 360/241 |
| 7,339,768 B2 * | 3/2008 | Ito et al. | ..................... | 360/261.1 |
| 7,406,701 B2 * | 7/2008 | Kim | .............................. | 720/652 |
| 7,467,396 B2 * | 12/2008 | Wu | ................................ | 720/652 |
| 7,502,196 B2 * | 3/2009 | Nayak et al. | .................... | 360/75 |
| 7,518,831 B2 * | 4/2009 | Moore et al. | ............... | 360/261.1 |
| 7,641,488 B2 * | 1/2010 | Ho et al. | ...................... | 439/162 |
| 7,667,931 B1 * | 2/2010 | Brause et al. | ............... | 360/264.2 |
| 7,729,720 B2 * | 6/2010 | Suh et al. | .................... | 455/550.1 |
| 2003/0193787 A1* | 10/2003 | Manabe et al. | ............... | 361/752 |
| 2008/0174636 A1* | 7/2008 | Kim et al. | ........................ | 347/47 |
| 2009/0119692 A1* | 5/2009 | Fujimori et al. | .............. | 720/652 |

FOREIGN PATENT DOCUMENTS

| | | | | |
|---|---|---|---|---|
| JP | 05145228 A | * | 6/1993 | |
| JP | 06152077 A | * | 5/1994 | |
| JP | 09191166 A | * | 7/1997 | |
| JP | 10337928 A | * | 12/1998 | |
| JP | 2007256586 A | * | 10/2007 | |

* cited by examiner

*Primary Examiner* — Brian Miller

(57) ABSTRACT

A flexible circuit having a first end attached to a clamping mechanism and a second end attached to a carriage to move, a magnetic head to read a tape. The clamping mechanism has a curved surface to allow the flexible circuit to maintain an S-shape when the magnetic head moves with respect to the magnetic tape.

6 Claims, 3 Drawing Sheets

FLEXIBLE CIRCUIT FOR USE WITH A MAGNETIC HEAD

CROSS-REFERENCE TO RELATED APPLICATIONS

This application is a divisional application of U.S. Ser. No. 11/796,673 filed on 27 Apr. 2007 now U.S. Pat. No. 8,004,797, which is incorporated herein by reference.

BACKGROUND

A widely used storage medium for storing information is storage tape, such as magnetic tape. Storage tapes are mounted in various types of tape cassettes or cartridges. The cassette or cartridge is loaded into a tape drive which includes a tape head used to read and write data to the magnetic tape.

Some tape drives include a flexible circuit that is coupled to the tape head. Flexible circuits route traces that electrically connect read and write elements of the tape head to respective read and write circuitry mounted elsewhere in the tape drive, such as on a circuit board.

Flexible circuits are commonly configured to roll through a single loop as the actuator moves up and down. The location of the loop changes as the actuator moves, but the radius of the loop remains constant. If the flexible circuit improperly bends or flexes while the tape head moves, then fatigue and stress can shorten the lifespan of the flexible circuit.

DETAILED DESCRIPTION

Exemplary embodiments are directed to apparatus, systems, and methods for using flexible circuits or ribbon cables. In one embodiment, the flexible circuit includes flexible circuit loops that flex to form a lazy "S" shape at one end of an actuator cycle. At the other end of the cycle, the flexible circuit compresses and flexes to form a tighter "S" shape (i.e., an S shape having smaller radii at the bends).

One embodiment includes a clamping mechanism at a fixed end of the flexible circuit. The clamping mechanism constrains the flex tightly at its far end, but then gradually opens up along the flex length. The configuration of the clamping mechanism prevents the flex from hinging at one point and effectively spreads out or enlarges the area that is subjected to repetitive stress. In one embodiment, the clamping mechanism provides a curved or arcuate surface over which the flexible circuit bends.

The flexible circuit has first and second ends that have S shapes or partial loops at opposite ends. In one embodiment, one end has a loop with a larger radius or curvature than a loop at the second end. In another embodiment, both ends have an S-shape curve with a similar or same degree of curvature.

Exemplary embodiments utilize less physical space than a conventional rolling loop. Further, as compared to such conventional rolling loops, exemplary embodiments utilize shorter trace lengths to transmit signals between the moving head and fixed clamping mechanism. This shorter length reduces circuit capacitance and inductance and enables higher write speeds and data rates. Further, exemplary embodiments eliminate or reduce occurrence of broken flexible circuits due to stress induced bending.

Figure 1:
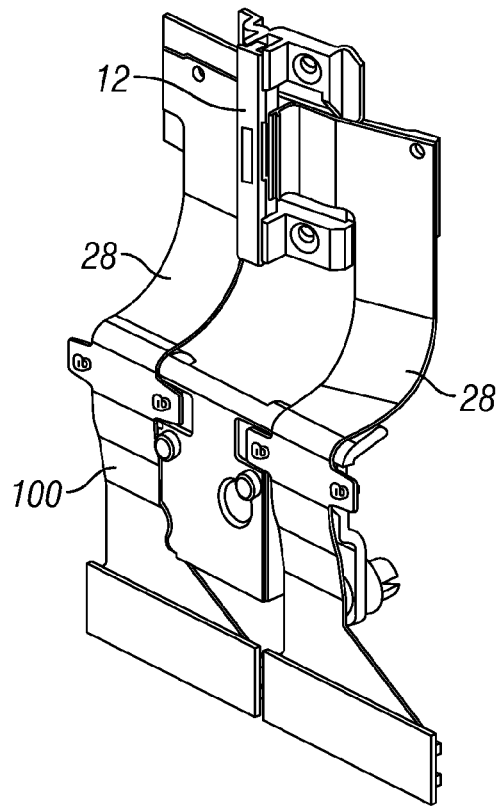
FIG. 1 is a perspective view of a flexible circuit and clamping mechanism according to one exemplary embodiment.

FIG. 1 illustrates a flexible circuit 28 and clamping mechanism 100 (see FIGS. 3-5) being used with a magnetic head 12 according to one exemplary embodiment. In one embodiment, the flexible circuit and clamping mechanism are used in a tape drive 10 shown in FIG. 2.

Figure 2:
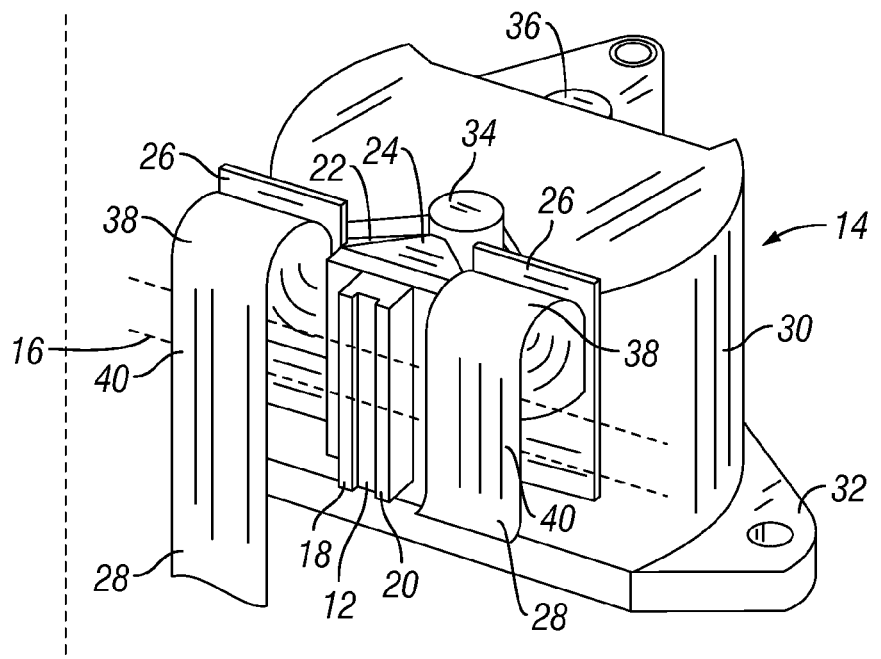
FIG. 2 is a perspective view of a tape drive according to one exemplary embodiment.

As shown in FIGS. 1 and 2, the tape drive 10 comprises a head 12, such as a magnetic head, mounted on a carriage assembly 14. Head 12 engages a tape 16 as tape 16 moves across a face of head 12 to record data on tape 16 and/or to read data from tape 16.

As illustrated in FIG. 2, head 12 comprises two head "bumps" 18, 20. In this example, each head bump 18 and 20 functions as an individual head capable of recording to and reading information from tape 16. For example, as a first head bump records or writes data to the tape, the second head bump reads the recorded data to detect errors. Each of the read/write head bumps 18 and 20 includes a single read/write element or a series of read/write elements stacked along the head to enable head 12 to read from or write to several tracks at the same time.

In one embodiment, head 12 is part of a head assembly 22 having a head carrier 24 to which head 12 is mounted. Head assembly 22 also has at least one flexible circuit stiffener 26. In the embodiment illustrated, the head subassembly 22 comprises a pair of flexible circuit stiffeners 26.

A flexible circuit 28 is coupled to head 12 by, for example, the flexible circuit stiffener 26. Flexible circuits 28 are affixed to corresponding circuit stiffeners 26 via an appropriate connection mechanism, such as an adhesive or other fastener. Flexible circuits 28 also are electrically coupled with head 12 and provide communication paths for data and servo information to and from head 12.

By way of example, carrier assembly 14 includes a magnetic housing 30 supported by an actuator base 32. Additionally, carriage assembly 14 is movable to allow reciprocal motion along a primary guide rail 34 and a secondary guide rail 36. Head 12 is mounted to carriage assembly 14 and thus is moved by carriage assembly 14 in a direction generally perpendicular to the direction of tape travel for proper positioning of the head elements during reading and writing operations. Movement of carriage assembly 14 is accomplished, for example, with an actuator, such as a voice coil motor (not shown).

One end of flexible circuit 28 is affixed to the movable carriage assembly 14 while another end of the flexible circuit is affixed or mounted to a non-movable clamping mechanism (discussed in connection with FIGS. 3-5).

Figure 3:
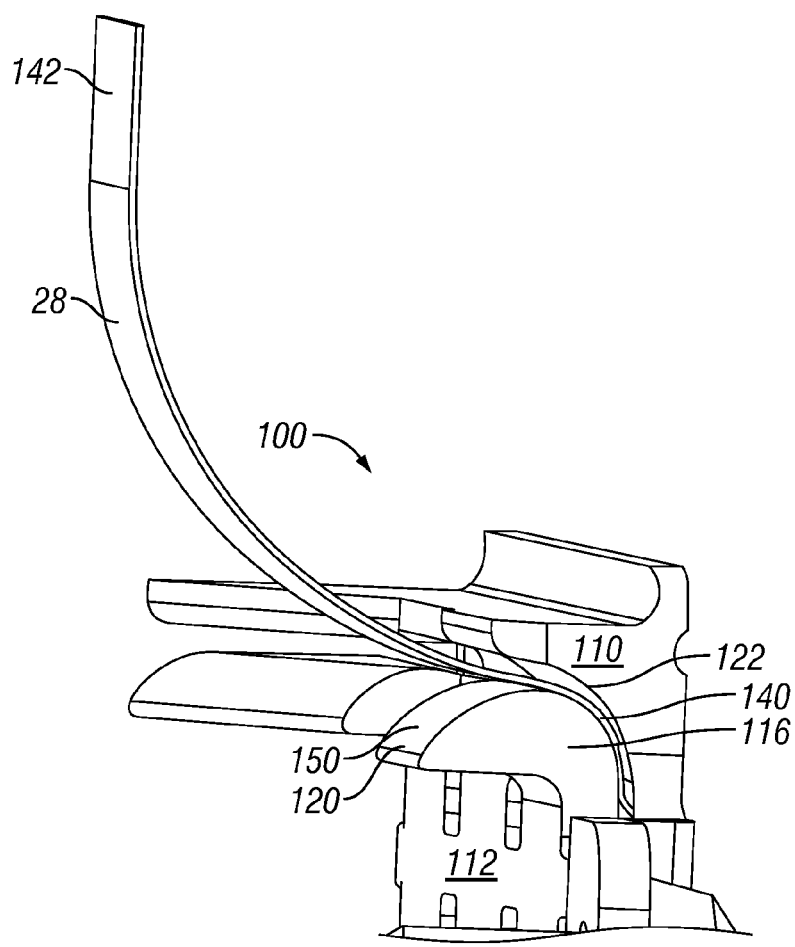
FIG. 3 is a perspective view of a clamping mechanism for a flexible circuit at a top stroke according to one exemplary embodiment.
Figure 4:
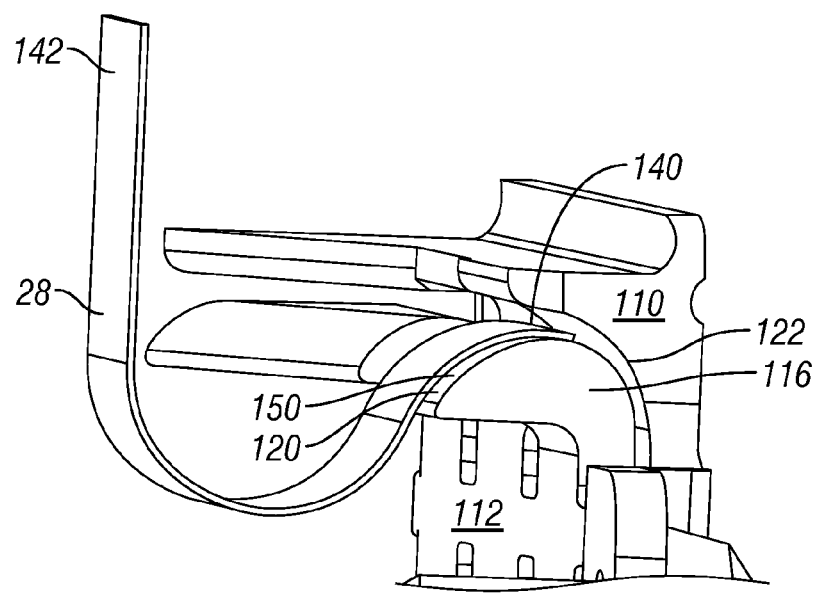
FIG. 4 is a perspective view of a clamping mechanism for a flexible circuit at a bottom stroke according to one exemplary embodiment.
Figure 5:
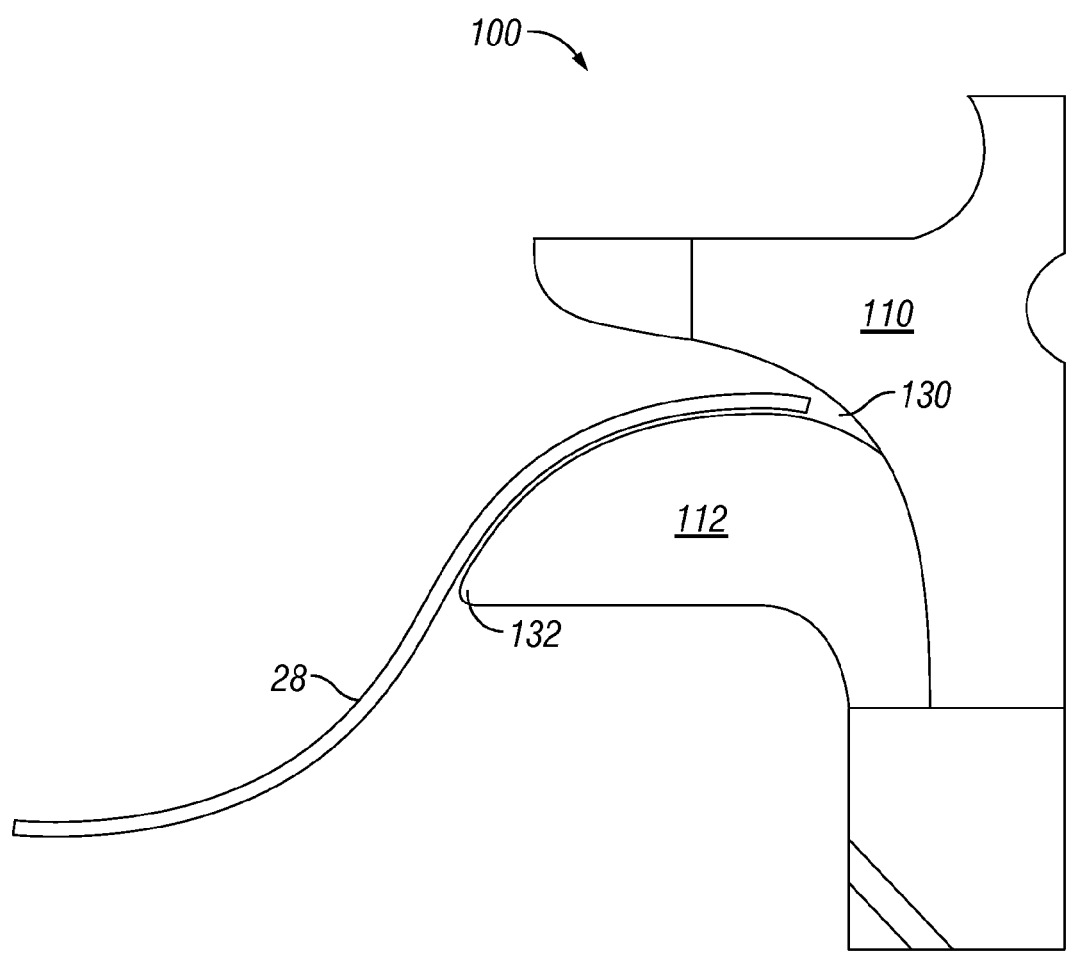
FIG. 5 is a side view of a clamping mechanism for a flexible circuit according to one exemplary embodiment.

FIGS. 3-5 show a flex holder or clamping mechanism 100 for holding an end of flexible circuit 28. The shape of the clamping mechanism enables the flexible circuit to bend or flex into an S-shaped configuration. As the flexible circuit compresses and elongates, a hinge point that causes fatigue failure is not present. Instead, bending force of the flexible circuit is spread out or dispersed over a relatively large curved surface area.

The clamping mechanism includes an outer flex holder 110 and an inner flex holder 112. Together, these two components hold the flexible circuit and provide an elongated surface area over which the flexible circuit engages as it is compressed and elongated.

In one embodiment, the inner flex holder 112 includes a head, foot, or top portion 116 having a circular or arcuate outer surface 120. The outer flex holder 110 includes a circular or arcuate surface 122 adjacent to surface 120. In one embodiment, surface 120 and 122 are complementary and have a similar or same degree of curvature.

In one embodiment, surfaces 120 and 122 are semi-circular, smooth and have a continuous and constant degree of curvature. In another embodiment, the curvatures have varying degrees of curvature (i.e., a non-constant degree of curvature or non-constant radius). For example, the curvature of the surface has increasing radius or decreasing radius as the curve progresses from a first location 130 to a second location 132 (see FIG. 5).

The flexible circuit 28 has a first end 140 that connects to the clamping mechanism 100 and a second end 142 that connects to the carriage assembly or head (shown in FIG. 2). As noted, the flexible circuit bends as the carriage moves. FIG. 3 shows the flexible circuit 28 at an extended or stretched position (example, at a top of a stroke). Here, the head or carriage is farthest from the clamping mechanism. FIG. 4 shows the flexible circuit 28 at a contracted or compressed position (example, at a bottom of a stroke). Here, the carriage is closest to the clamping mechanism.

As shown in FIGS. 3-4, the flexible circuit maintains a generally S-shape as the carriage assembly moves and compresses and stretches the flexible circuit. When the flexible circuit is in an extended or stretched position (FIG. 3), the first end 140 rises from a portion 150 of surface 120. By contrast, when the flexible circuit is in a more compressed position (FIG. 4), the first end 140 engages or seats against the portion 150 of the surface 120. Thus, as the flexible circuit moves, the end 140 rolls along or wraps around the curved surface 120.

As illustrated, one or more of the flexible circuits is formed with an S-shaped loop. The loop tends to minimize and linearize detrimental forces acting on traces within the flexible circuit as head moves relative to the path of tape. Further, a shorter distance between the head and pre-amp circuit (example, located at fixed end of the flexible circuit) decreases inductance and capacitance in the flexible circuit.

Although an embodiment of a tape drive head assembly has been illustrated and described herein, it should be noted that the flexible circuit can be used in a variety of applications, such as a tape drive, printer, or other electronic device wherein the flexible circuit connects one or more components that move relative to each other. By way of example, embodiments include, but are not limited to, tape drives, printers (example, with a movable print head), and linear actuators for a disk drive. Additionally, various tape drive head assemblies, as well as tape drive head components, can be utilized with at least one of the flexible circuits 28. For example, head 12 can be an 8-channel data head, a 16-channel data head, or other N-channel data heads.

The above discussion is meant to be illustrative of the principles and various embodiments. Numerous variations and modifications will become apparent to those skilled in the art once the above disclosure is fully appreciated. It is intended that the following claims be interpreted to embrace all such variations and modifications.

What is claimed is:

1. A method, comprising:
    clamping a first end of as flexible circuit to a clamping mechanism having a curved surface and a second end of the flexible circuit to a carriage to move a magnetic head to read a tape; and
    bending the first end of the flexible circuit around the curved surface as the carriage moves the magnetic head with respect to the magnetic tape.

2. The method of claim 1, wherein the curved surface has a smooth outer surface with an increasing radius.

3. The method of claim 1 further comprising, the clamping mechanism stretching the flexible circuit while maintaining the flexible circuit to have an S-shape when the carriage is farthest from the clamping mechanism.

4. The method of claim 1 further comprising, the clamping mechanism compressing, the flexible circuit while maintaining the flexible circuit to have an S-shape when the carriage is closest to the clamping mechanism.

5. The method of claim 1 further comprising, forming an S-shape with the flexible circuit, one loop of the S-shape being formed at the curved surface.

6. The method of claim 1, wherein the clamping mechanism at the first end further includes a second curved surface to clamp the first end of the flexible circuit between two oppositely disposed curved surfaces.

* * * * *

UNITED STATES PATENT AND TRADEMARK OFFICE
CERTIFICATE OF CORRECTION

| | |
|---|---|
| PATENT NO. | : 8,264,795 B2 |
| APPLICATION NO. | : 13/183440 |
| DATED | : September 11, 2012 |
| INVENTOR(S) | : Paul W. Poorman et al. |

Page 1 of 1

It is certified that error appears in the above-identified patent and that said Letters Patent is hereby corrected as shown below:

In column 4, line 20, in Claim 1, delete "as" and insert -- a --, therefor.

In column 4, line 34, in Claim 4, delete "compressing," and insert -- compressing --, therefor.

Signed and Sealed this
Fifth Day of February, 2013

Teresa Stanek Rea
*Acting Director of the United States Patent and Trademark Office*